(12) United States Patent
Itadani et al.

(10) Patent No.: US 10,612,665 B2
(45) Date of Patent: Apr. 7, 2020

(54) MECHANICAL SEAL

(71) Applicant: EAGLE INDUSTRY CO., LTD., Tokyo (JP)

(72) Inventors: Masatoshi Itadani, Tokyo (JP); Keiichi Chiba, Tokyo (JP); Hikaru Katori, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 15/767,989

(22) PCT Filed: Nov. 4, 2016

(86) PCT No.: PCT/JP2016/082755
§ 371 (c)(1),
(2) Date: Apr. 12, 2018

(87) PCT Pub. No.: WO2017/082158
PCT Pub. Date: May 18, 2017

(65) Prior Publication Data
US 2018/0306327 A1    Oct. 25, 2018

(30) Foreign Application Priority Data
Nov. 9, 2015 (JP) .................................. 2015-219606

(51) Int. Cl.
*F16J 15/34* (2006.01)

(52) U.S. Cl.
CPC .............. *F16J 15/34* (2013.01); *F16J 15/348* (2013.01)

(58) Field of Classification Search
CPC ...... F16J 15/34; F16J 15/3404; F16J 15/3412; F16J 15/3452; F16J 15/348; F16J 15/3408; F16J 15/3416; F16J 15/3484; F16J 15/3488; F16J 15/36; F16J 15/3464
See application file for complete search history.

(56) References Cited

U.S. PATENT DOCUMENTS

| 3,612,548 | A | * | 10/1971 | Tracy | F16J 15/38 277/385 |
| 4,406,460 | A | * | 9/1983 | Slayton | F16J 15/164 277/401 |
| 5,199,719 | A | | 4/1993 | Heinrich et al. | 277/40 |
| 5,249,812 | A | * | 10/1993 | Volden | F16J 15/162 277/361 |

(Continued)

FOREIGN PATENT DOCUMENTS

| FR | 2651294 | 3/1991 | ............... F16J 15/36 |
| GB | 2081399 | 2/1982 | ............... F16J 15/34 |

(Continued)

OTHER PUBLICATIONS

International Search Report (w/translation) and Written Opinion (no translation) issued in application No. PCT/JP2016/082755, dated Dec. 27, 2016 (7 pgs).

(Continued)

*Primary Examiner* — Vishal A Patel
*Assistant Examiner* — L. Susmitha Koneru
(74) *Attorney, Agent, or Firm* — Hayes Soloway P.C.

(57) ABSTRACT

A mechanical seal includes: a rotation-side member and a seal case positioned and fixed to each other, and in which the engaged state can be released by bringing the rotation-side member and the seal case closer to each other in the axial direction.

20 Claims, 8 Drawing Sheets

(56) References Cited

U.S. PATENT DOCUMENTS

| | | | | | |
|---|---|---|---|---|---|
| 5,468,002 | A | * | 11/1995 | Wasser | F16J 15/3404 277/361 |
| 5,501,471 | A | * | 3/1996 | Ohba | F16J 15/3464 277/379 |
| 5,529,315 | A | * | 6/1996 | Borrino | F16J 15/004 277/352 |
| 5,544,897 | A | * | 8/1996 | Di Pietro | F16J 15/348 277/389 |
| 5,553,867 | A | * | 9/1996 | Rockwood | F04D 29/128 277/348 |
| 5,639,097 | A | * | 6/1997 | Gardner | F16J 15/3452 277/411 |
| 8,714,556 | B2 | * | 5/2014 | Pinto | B22F 5/106 277/371 |
| 2003/0011135 | A1 | * | 1/2003 | Meacham | F16J 15/3404 277/408 |
| 2003/0230851 | A1 | * | 12/2003 | Roddis | F16J 15/3484 277/391 |
| 2005/0230923 | A1 | | 10/2005 | Kametaka et al. | 277/602 |
| 2007/0210526 | A1 | * | 9/2007 | Basu | F16J 15/3468 277/359 |
| 2007/0262532 | A1 | * | 11/2007 | Ohama | F16J 15/3404 277/390 |
| 2019/0056030 | A1 | * | 2/2019 | Iguchi | F16J 15/3448 |

FOREIGN PATENT DOCUMENTS

| | | | |
|---|---|---|---|
| JP | H01146067 | 10/1989 | F16J 15/34 |
| JP | 2005265075 | 9/2005 | F16J 15/34 |

OTHER PUBLICATIONS

International Preliminary Report on Patentability (translation) issued in application No. PCT/JP2016/082755, dated May 24, 2018 (6 pgs).

Chinese Office Action (w/translation) issued in application No. 201680060388.1, dated Jun. 20, 2019 (13 pgs).

Extended European Search Report issued in application No. 16864121.5, dated May 14, 2019 (6 pgs).

* cited by examiner

MECHANICAL SEAL

TECHNICAL FIELD

The present invention relates to a mechanical seal suitable for a shaft sealing component for a drive shaft or the like of fluid equipment.

BACKGROUND ART

A mechanical seal is installed for use between a housing of fluid equipment and a rotating shaft arranged to extend through the housing. The mechanical seal prevents leakage of a fluid from the inside to the outside or from the outside to the inside of the fluid equipment by a sliding contact between a stationary sealing ring axially movably biased and a rotating sealing ring inhibited from axially moving.

As a conventional mechanical seal, for example, Patent Literature 1 discloses a mechanical seal which secures sealing performance by a sliding contact between a sealing face of a rotating sealing ring (rotation-side member) and a sealing face of a stationary sealing ring (stationary-side member). The rotating sealing ring including the sealing face is fixed to a rotating shaft. The stationary sealing ring including the sealing face is fixed in a housing of fluid equipment in such a way as to be axially movably held via a biasing means (stationary-side member) by a cartridge (stationary-side member).

CITATION LIST

Patent Literature

Patent Literature 1: Japanese Unexamined Patent Application Publication No. 2005-265075 (FIG. 1)

SUMMARY OF INVENTION

Technical Problem

In consideration of workability in installing such a mechanical seal in the fluid equipment, the mechanical seal is treated in a state where the rotation-side member and the stationary-side member are assembled with each other into a unitized set of components. Here, in order to prevent foreign substances from entering between the sealing faces during transportation or installation in the fluid equipment, an intermediate member such as resin is press-fitted between the rotation-side member and the stationary-side member, therefore generating a frictional force between the intermediate member and the rotation-side member and a frictional force between the intermediate member and the stationary-side member. Accordingly, the frictional forces are exerted against a biasing force generated by the biasing means of the stationary-side member; therefore, the rotation-side member is positioned and fixed to the stationary-side member so that the sealing faces are maintained in contact with each other.

However, in order that such an intermediate member is used for positioning and fixing the rotation-side member to the stationary-side member so that the rotation-side member and the stationary-side member are maintained in contact with each other, the intermediate member needs to be inserted between the rotation-side member and the stationary-side member after the rotation-side member and the stationary-side member are assembled with each other. In addition, the intermediate member needs to be removed after the mechanical seal is installed in the fluid equipment. As a result, man-hours for the operation to position and fix the mechanical seal and the operation to install the mechanical seal in the fluid equipment are increased.

Solution to Problem

The present invention is made in view of the foregoing problem, and an object of the present invention is to provide a mechanical seal that easily enables operation for positioning and fixing in the mechanical seal and installation thereof in fluid equipment.

In order to solve the foregoing problem, a mechanical seal according to a first aspect of the present invention includes:

a rotation-side member including a cylindrical portion fixed to a rotating shaft of fluid equipment and a sealing face, the rotation-side member being rotatable with the rotating shaft; and a stationary-side member including a seal case fixed to a housing of the fluid equipment and having elasticity, a stationary ring having a sealing face and being slidably contactable with the sealing face of the rotation-side member, and a biasing means held in the seal case to bias the stationary ring so that the stationary ring is movable in an axial direction of the rotating shaft, characterized in that:

the seal case includes an inner circumferential portion extending along the rotating shaft;

the inner circumferential portion includes an engaging portion and the cylindrical portion includes an engaged portion; the cylindrical portion includes a recessed surface provided on the opposite side of the engaged portion from the stationary-side member in the axial direction and recessed radially inward from an outer circumferential surface of the engaged portion; an outer diameter of the engaged portion of the cylindrical portion is greater than an inner diameter of the engaging portion of the inner circumferential portion; the engaged portion is continuously formed on the cylindrical portion over an entire circumference thereof; and the engaging portion and the engaged portion come into contact with each other to bring the rotation-side member and the stationary-side member into engagement with each other.

According to the first aspect, the engaging portion is provided at the stationary-side member and the engaged portion is provided at the rotation-side member, and the engaged portion of the cylindrical portion is continuously formed over the entire circumference. The rotation-side member and the seal case are brought close to each other; thereby, the seal case is elastically deformed to be engaged with the cylindrical portion and positioned thereto. Accordingly, it is easy to carry the mechanical seal around in a state where the sealing faces are maintained in contact with each other, and from this state, the rotation-side member and the seal case are brought closer to each other and thereby the mechanical seal can be provided in a normal use state. Furthermore, in the operation for assembling the mechanical seal and positioning and fixing in the mechanical seal, the rotation-side member and the stationary-side member can be brought close to each other without regulating a circumferential position of the inner circumferential portion with respect to the cylindrical portion. Therefore, the positioning and fixing operation can be easily performed.

The mechanical seal according to a second aspect of the present invention may be characterized in that an inclined surface is formed in one end of an outer circumferential surface of the cylindrical portion on a side of the stationary-side member so as to be inclined inward with respect to an axis of the cylindrical portion.

According to the second aspect, when the rotating-side member and the seal case are brought close to each other, an end of the inner circumferential portion of the seal case runs on the inclined surface, and the end of the inner circumferential portion is subsequently guided by a taper-shaped portion to be radially moved. Accordingly, the inner circumferential portion is facilitated to elastically be deformed, therefore being smoothly shifted to an engaged state.

The mechanical seal according to a third aspect of the present invention may be characterized in that a slit is provided in an end of the inner circumferential portion.

According to the third aspect, due to the slit in the end of the inner circumferential portion, a circumferential biding force of the end of the inner circumferential portion becomes small. The inner circumferential portion can be facilitated to be deformed in a diameter expanding direction.

The mechanical seal according to a fourth aspect of the present invention may be characterized in that the engaging portion and the engaged portion radially come into contact to be engaged with each other.

According to the fourth aspect, axial positioning is fixed by friction due to a contact of the engaging portion with the engaged portion, and the engaging portion of the inner circumferential portion and the engaged portion of the cylindrical portion are radially brought in contact and engagement with each other. Therefore, radial looseness between the cylindrical portion and the seal case can be suppressed, and at the time of installation in the fluid equipment, the installation can be performed in a state where the coaxiality between the stationary-side member and the rotation-side member is maintained.

The mechanical seal according to a fifth aspect of the present invention may be characterized in that the engaging portion and the engaged portion axially come into contact to be engaged with each other.

According to the fifth aspect, the stationary-side member and the rotation-side member can be surely held to each other.

The mechanical seal according to a sixth aspect of the present invention may be characterized in that the rotation-side member is formed of an integral sintered material.

According to the sixth aspect, rigidity of the cylindrical portion of the rotation-side member can be secured; therefore, a normal force can be surely generated and the engaging portion can be firmly and frictionally engaged.

The mechanical seal according to a seventh aspect of the present invention may be characterized in that the engaged portion of the cylindrical portion is formed by an inclined surface inclined from an outer circumferential surface of the cylindrical portion to the recessed surface.

According to the seventh aspect, the engaging portion of the inner circumferential portion is brought into engagement with the inclined surface; thereby, positioning and fixing can be firmly performed and positioning and fixing can be surely and easily performed.

BRIEF DESCRIPTION OF DRAWINGS

FIG. 5A and FIG. 53 are front cross-sectional views of the mechanical seal according to the first embodiment, respectively illustrating a state where the stationary-side member is installed in a housing and an in-use state after a rotating shaft is attached to the rotation-side member;

DESCRIPTION OF EMBODIMENTS

Figure 1:
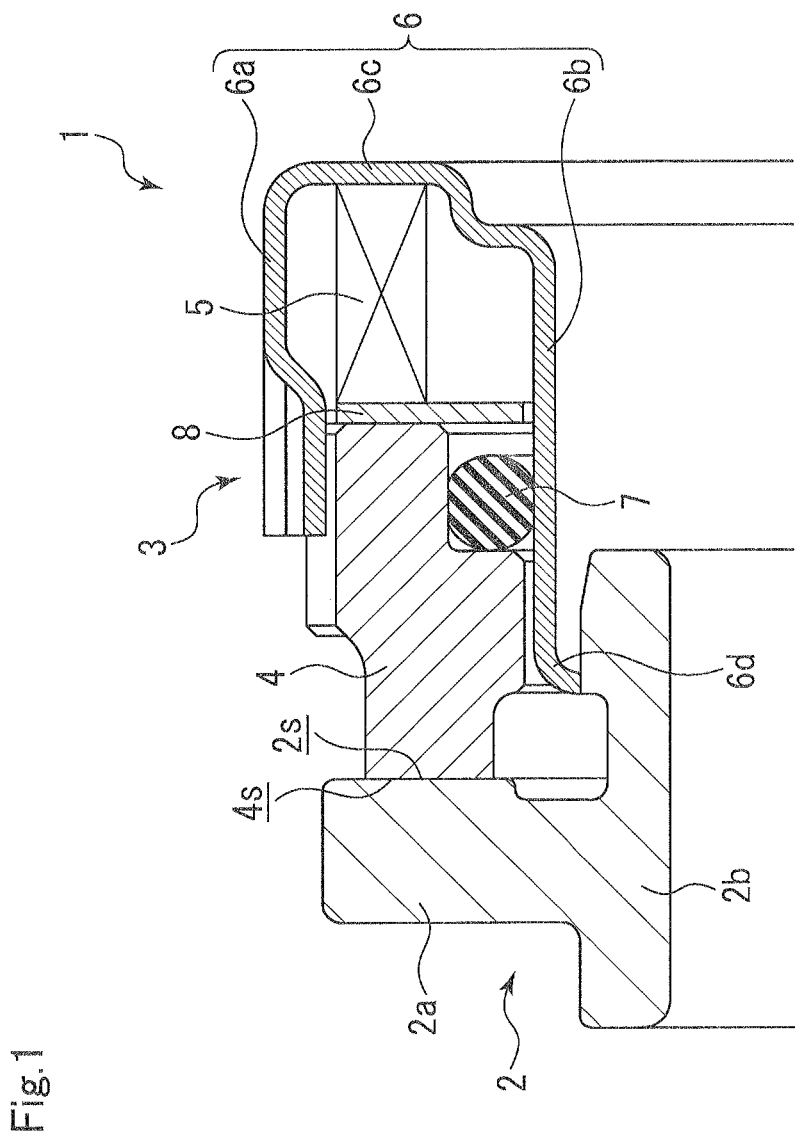
FIG. 1 is a front cross-sectional view illustrating a state where a first embodiment of the mechanical seal according to the present invention is engaged.

Modes for carrying out a mechanical seal according to the present invention will be described below based on embodiments. In the descriptions below, a right to left direction in FIG. 1 is defined as an axial direction of the mechanical seal and an up to down direction in FIG. 1 is defined as a radial direction of the mechanical seal.

Also, in the descriptions below, an assembly operation means an operation for assembling a rotation-side member and a stationary-side member with each other; an engaged state means a state where the assembled rotation-side and stationary-side members are positioned and fixed relative to each other by engagement between an engaging portion and an engaged portion that configure the present invention; and an installation operation means an operation for installing the positioned and fixed rotation-side and stationary-side members as a mechanical seal in fluid equipment.

First Embodiment

A mechanical seal for high-speed rotation shown as a first embodiment will be described below with reference to FIG. 1 to FIG. 6.

As shown in FIG. 1, the mechanical seal 1 according to the present invention mainly includes a rotating ring 2 as a rotation-side member and a stationary-side member 3 that is configured by a stationary ring 4, multi-springs 5, a seal case 6, an O-ring 7, and a tension plate 8. A sealing face 2s formed at one of axial end surfaces of the rotating ring 2 and a sealing face 4s of the stationary ring 4, which is provided opposite to the sealing face 2s make sliding contact with each other; thereby, sealing is secured between a rotating shaft 10 and a housing 9 of the fluid equipment in which the mechanical seal 1 is installed (see FIG. 5). In an engaged state (FIG. 1) before the mechanical seal 1 is used, the sealing face 2s and the sealing face 4s are close contact with each other. Meanwhile, when the mechanical seal 1 is used (FIG. 5B), a small clearance is formed via a sealed fluid between the sealing face 2s and the sealing face 4s.

The rotating ring 2 mainly includes: a ring portion 2a provided with the sealing face 2s at one of the axial end surfaces; and a cylindrical portion 2b provided at a radially inward side of the ring portion 2a to axially extend and fixed to the rotating shaft 10 of the fluid equipment so as not rotate relative to the rotating shaft 10. A tapered surface 2p (an inclined surface), an uninclined surface 2q (an engaged portion) parallel to the axial direction, a vertical surface 2r perpendicular to the axial direction, and a recessed surface 2g are provided at the cylindrical portion 2b in order from an end thereof (see FIG. 3).

Further, a circumferential groove 2h is formed by the vertical surface 2r and the recessed surface 2g in the cylindrical portion 2b.

Furthermore, in consideration of mass balance at high-speed rotation, the rotating ring 2 is configured such that a radial cross-section including a radial cross-section of the rotating shaft is uniformly formed over an entire circumference of the rotating ring 2.

Next, the stationary-side member 3 mainly includes: the stationary ring 4 provided with the sealing face 4s; a plurality of multi-springs 5 circumferentially arranged at equal intervals and serving as biasing means that bias the stationary ring 4 via the tension plate 8 toward the rotating ring 2; the seal case 6 formed into a substantially U-shape in cross-section, holding the stationary ring 4 via the multi-springs 5, and fixed to the housing 9 of the fluid equipment; and the O-ring 7 interposed as a second seal between an inner circumferential portion 6b of the seal case 6 and the stationary ring 4.

Here, the rotating ring 2 and the stationary ring 4 are made of materials applied to sealing rings of a general mechanical seal. For example, the rotating ring 2 and the stationary ring 4 are made of a sintered material of SiC such as ceramics or carbon. Also, the sealing face 4s is provided at an end surface of the stationary ring 4, which faces the rotating ring 2. The multi-springs 5 are held by an end surface portion 6c of the seal case 6, and the multi-springs 5 axially bias the stationary ring 4 via the tension plate 8, therefore being configured so as to automatically adjust the amount of axial contact with the rotating ring 2. Also, ceramics or cemented carbide may be applied as a material of the stationary ring 4.

The seal case 6 mainly includes: an outer circumferential portion 6a to be fixed to the housing at the time of installation in the fluid equipment; the inner circumferential portion 6b provided at the inner circumferential side to axially extend; and the end surface portion 6c connecting the outer circumferential portion 6a and the inner circumferential portion 6b to form an end surface. An end portion 6d (engaging portion) having a hook shape curved radially inward is provided at an end of the inner circumferential portion 6b. A metallic plate is applied to the seal case 6.

Figure 2:
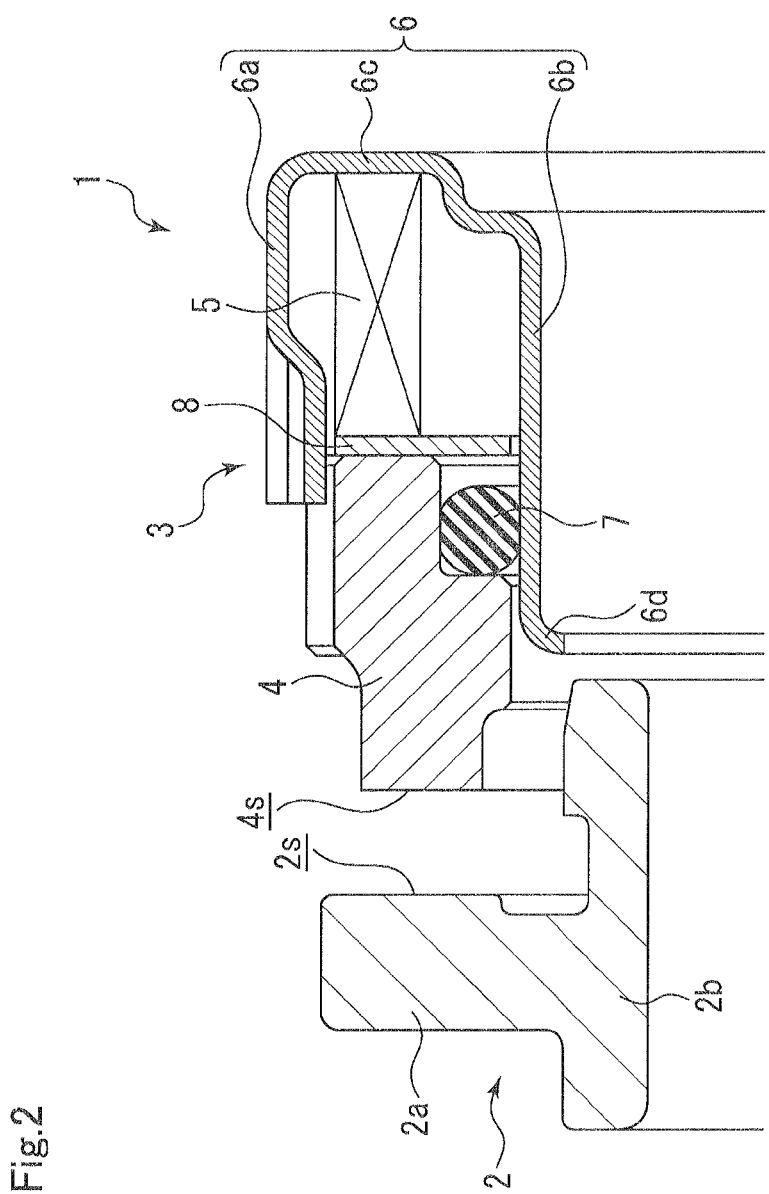
FIG. 2 is a front cross-sectional view illustrating a state before a stationary-side member and a rotation-side member of the mechanical seal according to the first embodiment are assembled.

Next, as shown in FIG. 2, the rotating ring 2 and the stationary-side member 3 are treated as separate components before being assembled. In order to improve the workability in installation in the fluid equipment or in order to prevent foreign substances from entering between the sealing faces in transportation, the rotating ring 2 and the stationary-side member 3 are brought close contact with each other in the axial direction, thereby being configured so as to be assembled with each other into a unitized set of components.

Next, the operation for positioning and fixing the rotating ring 2 and the stationary-side member 3 after they are assembled will be described.

Figure 3:
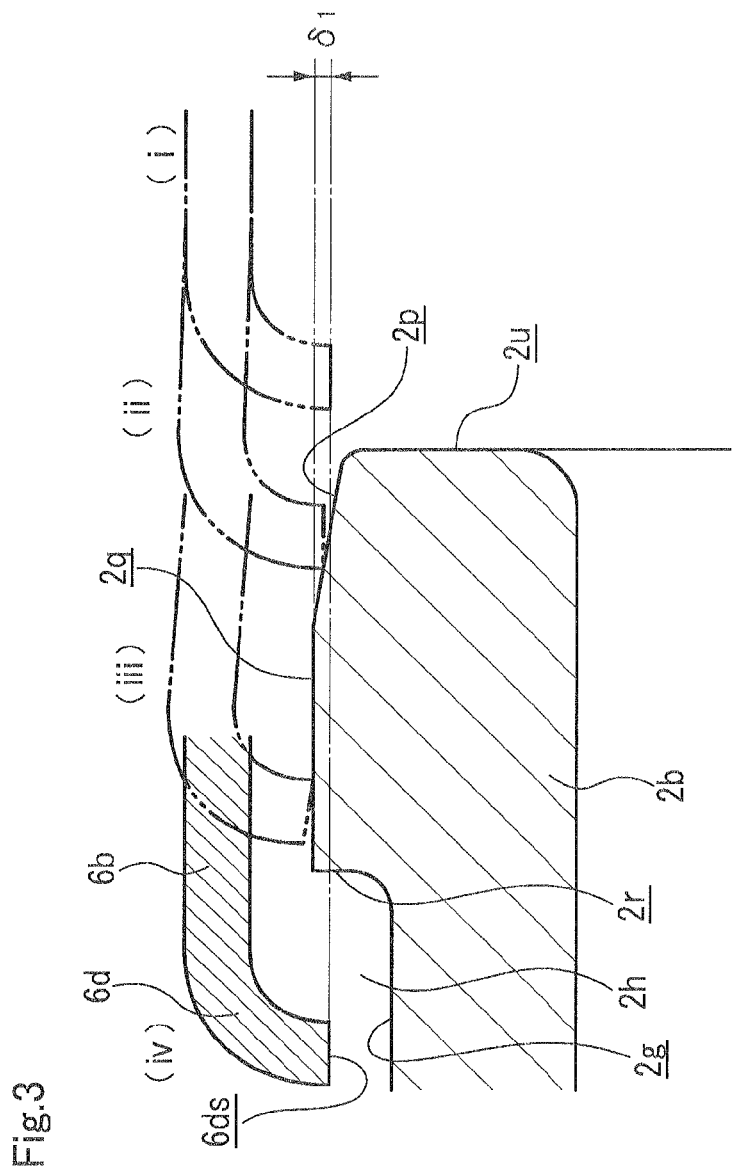
FIG. 3 is an enlarged front view of an engaging portion and its surrounding area, illustrating a state where the mechanical seal according to the first embodiment shifts to respective states.

When the rotating ring 2 and the stationary-side member 3 are brought close to each other in the axial direction from the state in FIG. 2 where the rotating ring 2 and the stationary-side member 3 are separated, the cylindrical portion 2b of the rotating ring 2 and the end portion 6d provided at the end of the inner circumferential portion 6b of the seal case 6 come into contact with each other to shift to an engaged state as shown in FIG. 3. More specifically, the rotating ring 2 and the stationary-side member 3 are brought close to each other from a state (i) before assembly in FIG. 3, therefore shifting to a state (ii) where the end portion 6d of the inner circumferential portion 6b and the tapered surface 2p of the cylindrical portion 2b are in contact with each other.

From this state, the rotating ring 2 and the stationary-side member 3 are brought closer to each other. In such a case, the inner circumferential portion 6b has elasticity in the radial direction; therefore, the end portion 6d is elastically deformed radially outward together with the inner circumferential portion 6b and is guided by the tapered surface 2p to gradually run thereon. Accordingly, in a state where the end portion 6d is moved on the uninclined surface 2q corresponding to an outer circumferential surface of the cylindrical portion 2b, an engaged state (iii) between the end portion 6d and the uninclined surface 2q is obtained. In the state (iii), sufficient dimensions are secured between an outer circumferential surface of the inner circumferential portion 6b of the seal case 6 and the stationary ring 4 positioned at the radially outward of the inner circumferential portion 6b; therefore, the radially outward deformation of the inner circumferential portion 6b does not cause interference between the end portion 6d and the stationary ring 4.

At this time, the end portion 6d has a radially outward displacement with a dimension of δ1; therefore, a radially inward restoring force is generated and the uninclined surface 2q is pressed with this restoring force by the end portion 6d. In other words, the uninclined surface 2q serves as the engaged portion of the rotating ring 2 in the present invention and the end portion 6d serves as the engaging portion of the stationary-side member 3 in the present invention, and the engaging portion and the engaged portion are in friction engagement (interference fit) with each other. Also, the O-ring 7 interposed between the inner circumferential portion 6b and the stationary ring 4 is deformed by the radially outward deformation of the inner circumferential portion 6b. A restoring force of the O-ring 7 due to this deformation also contributes as a force by which the end portion 6d presses the uninclined surface 2q.

Also, an in-use state (iv) where the rotating ring 2 and the stationary-side member 3 are brought close to each other will be described below.

Here, due to a reaction force generated by the multi-springs 5 pressing the stationary ring 4, a force acting in such a direction to axially separate the rotating ring 2 and the stationary-side member 3 from each other is applied via the end surface portion 6c to the seal case 6. Meanwhile, a radially outward normal force is generated at a contact portion between a distal end surface 6ds of the end portion 6d and the uninclined surface 2g. Since the cylindrical portion 2b is formed by a sintered material having a certain rigidity, the cylindrical portion 2b is not deformed radially inward and therefore can surely generate the radially outward normal force.

Accordingly, a frictional force acting in a direction against the reaction force generated by the multi-springs 5 is generated at the contact portion between the distal end surface 6ds of the end portion 6d and the uninclined surface 2q.

Therefore, in the state (iii) where the end portion 6*d* and the uninclined surface 2*q* are engaged with each other, the rotating ring 2 and the stationary-side member 3 are not separated from each other and are fixedly positioned with respect to each other. Consequently, the sealing face 2*s* of the rotating ring 2 and the sealing face 4*s* of the stationary ring 4 can be maintained in contact with each other. Thus, foreign substance can be prevented from entering between the sealing faces 2*s* and 4*s*. Also, if disassembly is needed for an operation such as an inspection, the end portion 6*d* is deformed so as to expand the diameter; thereby, the rotating ring 2 and the stationary-side member 3 can be easily separated from each other.

Figure 4:
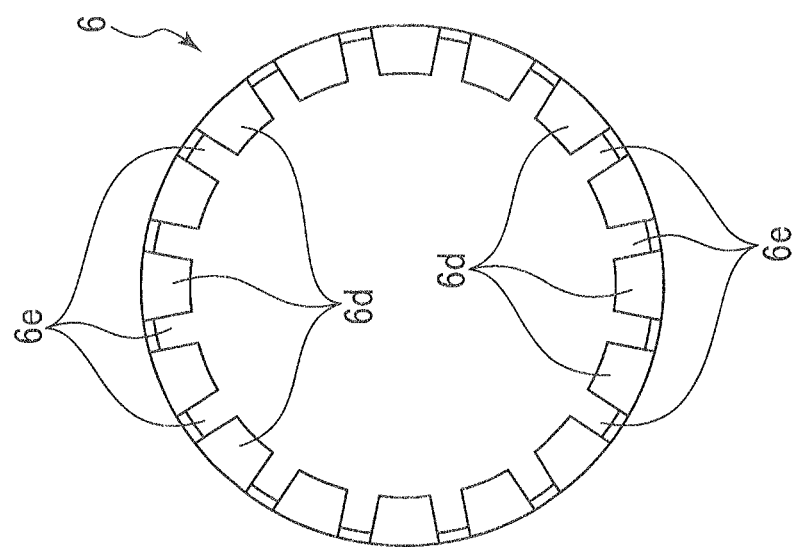
FIG. 4 is a side view showing a shape of an area surrounding an end portion of a seal case according to the first embodiment.

Also, as shown in FIG. 4, in the inner circumferential portion 6*b* of the seal case 6, plural end portions 6*d* are provided at predetermined intervals over an entire circumference and define slits 6*e* therebetween. The uninclined surface 2*q* with which the end portions 6*d* of the inner circumferential portion 6*b* are to be engaged is formed over the entire circumference, therefore being uniformly pressed in the circumferential direction to be firmly positioned and fixed. Further, the plural end portions 6*d* can uniformly press the cylindrical portion 2*b* in the circumferential direction; therefore, radial looseness between the seal case 6 and the cylindrical portion 2*b* can be suppressed. As a result, the clearance between the sealing faces 2*s*, 4*s* can be effectively prevented from being increased due to vibrations or the like during transportation.

Furthermore, the plural end portions 6*d* radially come into contact with the uninclined surface 2*q*; thereby, the axis of the seal case 6 is aligned with the axis of the cylindrical portion 2*b*. Therefore, in the operation for installing the mechanical seal 1 in the fluid equipment, at the time of fixing the rotating ring 2 to the rotating shaft 10 in a state where the stationary-side member 3 is fixed in the housing 9, there is no interference due to misalignment between the axis of the cylindrical portion 2*b* and the axis of the rotating shaft 10. As a result, the cylindrical portion 2*b* can be precisely attached to the rotating shaft 10.

Also, the slits 6*e* are circumferentially provided at the end of the inner circumferential portion 6*b* over the entire circumference; therefore, the end portions 6*d* have a poor biding force in the radial direction. Accordingly, when the end portions 6*d* are brought into contact with the cylindrical portion 2*b* of the rotating ring 2, the end portions 6*d* are facilitated to be elastically deformed in a diameter expanding direction together with the inner circumferential portion 6*b*. The number of slits 6*e* and the depth of each slit 6*e* are not limited to the configuration in the present embodiment and may be selectively changed as required in accordance with, for example, the biasing force of the multi-springs 5 or the thickness of the cylindrical portion 2*b* and the thickness of the inner circumferential portion 6*b*.

An example where the inner circumferential portion 6*b* of the seal case 6 of the stationary-side member 3 is deformed so as to increase the diameter radially outward in FIG. 3 is described in the present embodiment, but not limited thereto. The cylindrical portion 2*b* of the rotating ring 2 may be deformed so as to reduce the diameter radially inward. Alternatively, such deformations may be simultaneously generated.

Also, in the present embodiment, an edge of the distal end surface 6*ds* of the end portion 6*d* is in linear contact with the uninclined surface 2*q* as shown in FIG. 3; therefore, the end portion 6*d* can be firmly positioned and fixed to the uninclined surface 2*q* by engagement therewith. Alternatively, the distal end surface 6*ds* may be uniformly in surface contact with the uninclined surface 2*q*.

Furthermore, in the present embodiment, the tapered surface 2*p* is provided at an end of the cylindrical portion 2*b* in the axial direction. Accordingly, even if the end portions 6*d* of the inner circumferential portion 6*b* are positioned radially inward of the uninclined surface 2*q* of the cylindrical portion 2*b* before assembly (in FIG. 2), the cylindrical portion 2*b* of the rotating ring 2 and the seal case 6 are brought into contact with each other and thereafter the end portions 6*d* do not come into collision with a distal end surface 2*u* of the cylindrical portion 2*b*. Accordingly, the end portions 6*d* are guided by the tapered surface 2*p* to gradually run thereon, therefore being brought close to the cylindrical portion 2*b*, but not limited thereto. Alternatively, each end portion 6*d* may have a surface inclined in the same orientation as the tapered surface 2*p* and the cylindrical portion 2*b* may not have to include a tapered shape. Furthermore, the tapered surface 2*p* is not limited to a flat surface in a sectional view and may be a surface of any sectional shape including an arc shape, a convex shape or the like as long as the tapered surface 2*p* is shaped so as to guide the end portions 6*d* to the uninclined surface 2*q*.

Next, the operation for installing the mechanical seal 1 in the fluid equipment will be described.

Figure 5A:
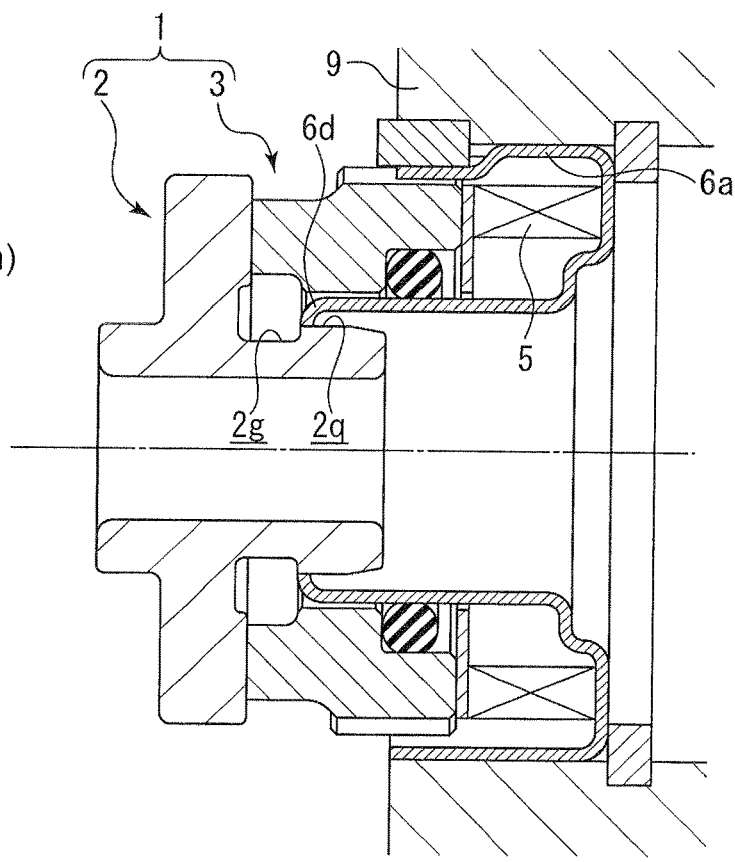
Figure 5B:
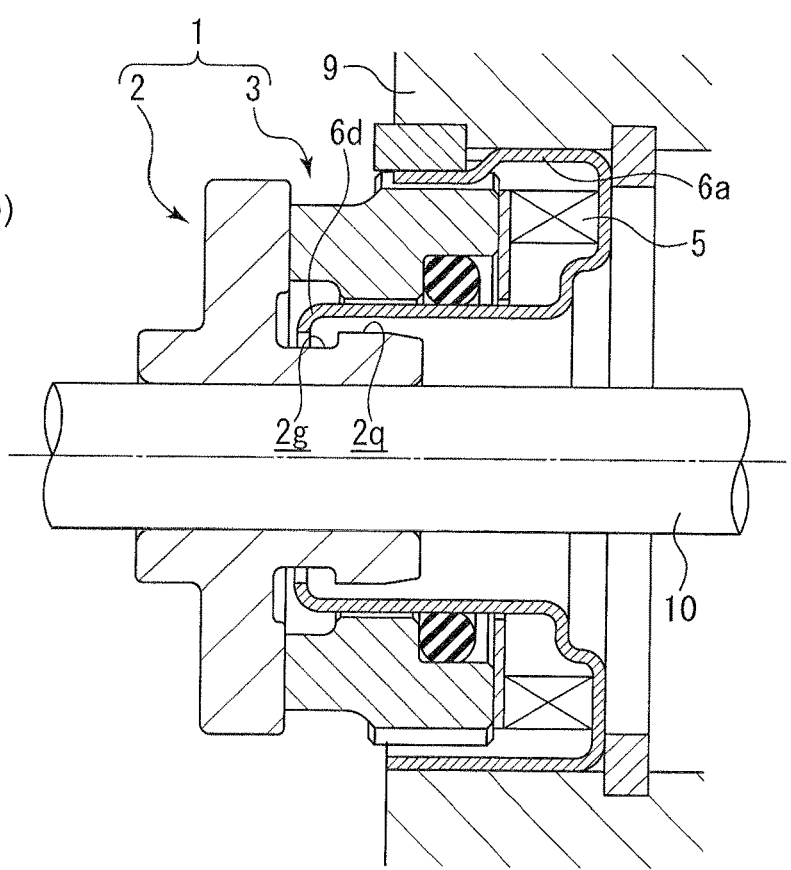

Firstly, as shown in FIG. 5A, the outer circumferential portion 6*a* of the stationary-side member 3 is fitted into the housing 9 to be fixed thereto. At this time, since the rotating ring 2 and the stationary-side member 3 have been already assembled, the rotating ring 2 is simultaneously installed in the fluid equipment.

Secondly, as shown in FIG. 5*5*, the rotating shaft 10 is fixed in a predetermined position with respect to the housing 9; therefore, the rotating ring 2 and the stationary-side member 3 are brought closer to each other, resulting in the in-use state (iv) as in FIG. 3.

At this time, the end portions 6*d* of the inner circumferential portion 6*b* of the seal case 6 are located over the circumferential groove 2*h* of the cylindrical portion 2*b*. Here, the recessed surface 2*g* forming a bottom surface of the circumferential groove 2*h* of the cylindrical portion 2*b* is provided at such a depth so that the recessed surface 2*g* does not contact with the end portions 6*d*. Therefore, the engaged state between the end portions 6*d* and the uninclined surface 2*q* is released. Accordingly, the displacement of δ1 of the end portions 6*d* generated in the engaged state before the installation of the mechanical seal 1 disappears, and a normal force generated between each end portion 6*d* and the cylindrical portion 2*b* is not exerted. Therefore, if the rotating ring 2 rotates relative to the stationary-side member 3 when the mechanical seal 1 is used, a frictional force which inhibits the rotation is not generated. As a result, the mechanical seal 1 can be provided in a normal use state.

As described above, the rotating ring 2 and the stationary-side member 3 are only brought close to each other in the axial direction; thereby, the end portions 6*d* and the uninclined surface 2*q* are engaged with each other to be positioned and fixed. Therefore, the sealing face 2*s* of the rotating ring 2 and the sealing face 4*s* of the stationary ring 4 can be maintained in contact with each other. In addition, the rotating ring 2 and the stationary-side member 3 are only brought closer to each other in the axial direction; thereby, the engaged state of the end portions 6*d* with the uninclined surface 2*q* is released and the mechanical seal 1 can be provided in a normal use state. Accordingly, an operation as conventionally applied to insert an intermediate member between the rotating ring 2 and the stationary-side member 3 and to remove the intermediate member after installation in the fluid equipment is not necessary. As a result, man-hours required for the assembly and installation operation can be reduced.

Next, a modified example of the mechanical seal 1 showing the first embodiment will be described.

Figure 6A:
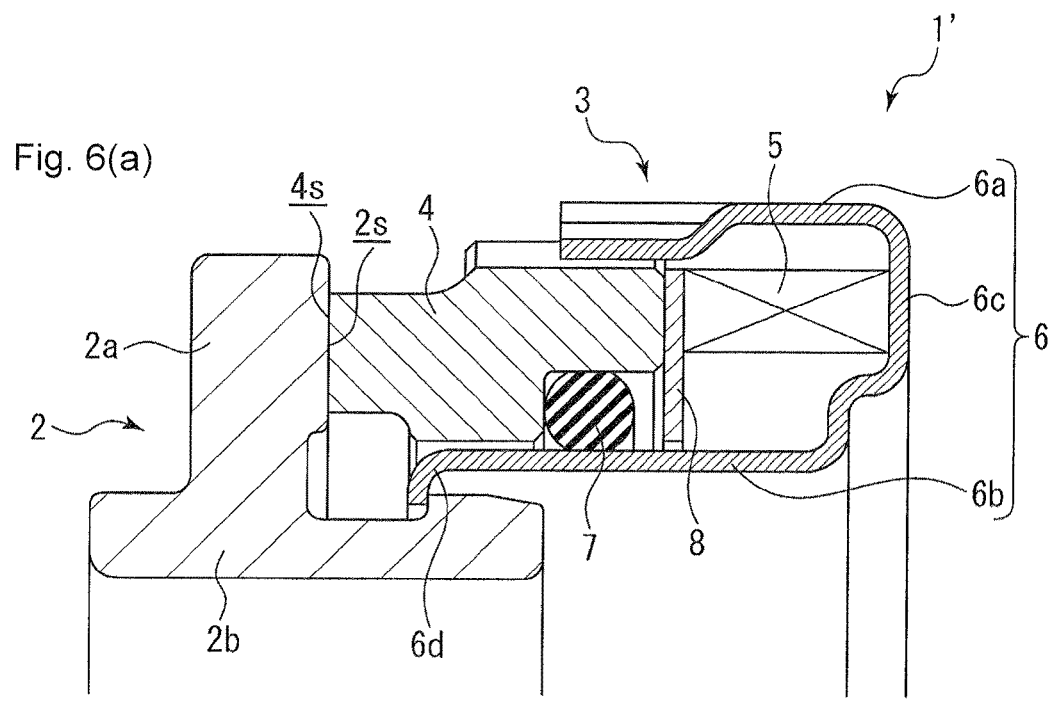
FIG. 6A is a front cross-sectional view of a mechanical seal according to a modified example of the first embodiment, illustrating a state where the mechanical seal is engaged.
Figure 6B:
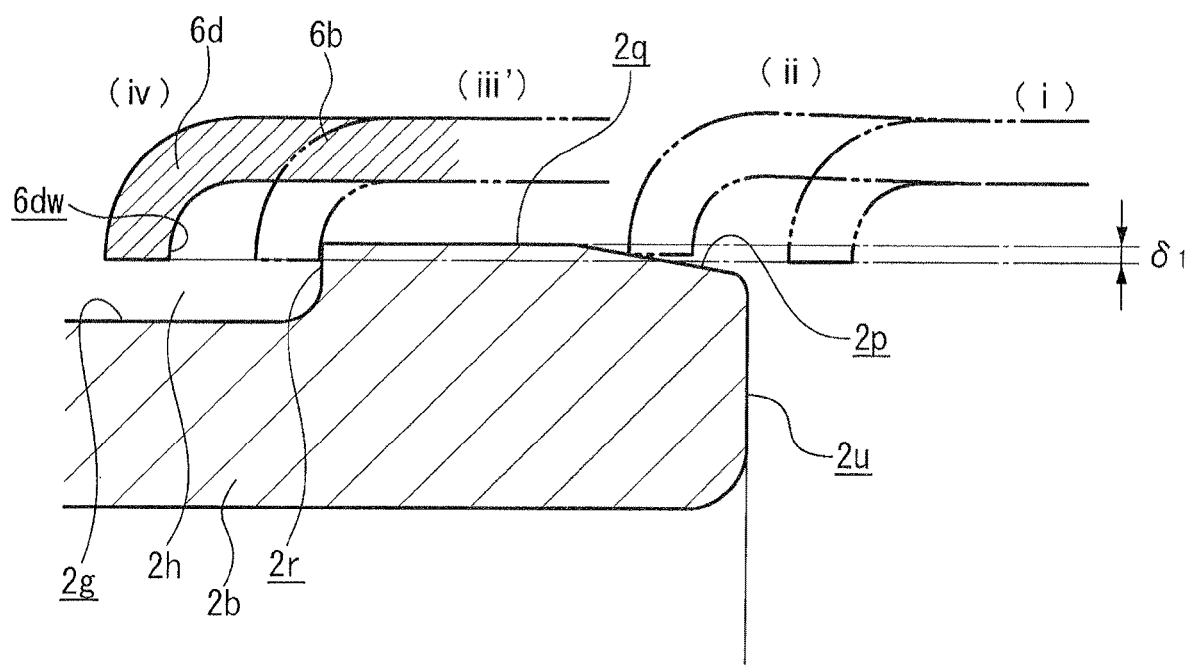
FIG. 6B is a front enlarged view of an area surrounding an engaging portion, illustrating a state where the mechanical seal shifts to respective states.

As shown in FIG. 6A, a mechanical seal 1' according to the modified example is identical in a component to the mechanical seal 1 but is different from the mechanical seal 1 in that the cylindrical portion 2b and the inner circumferential portion 6b are engaged via a different portion when the rotating ring 2 and the stationary-side member 3 are assembled. In the modified example, as shown in FIG. 6B, due to an engaged state between the end portions 6d and the vertical surface 2r, surface engagement is established between an end side surface 6dw (engaging portion) of each of the end portions 6d and the vertical surface 2r. In the modified example, the vertical surface 2r serves as an engaged portion of the rotating ring 2 in the present invention. Thus, the surface engagement (engagement) is established; thereby, a strong force can be exerted against an axial pull-out force. Accordingly, for example, even if a force in a pull-out direction is applied, for example, at the time of the installation in the fluid equipment, the rotating ring 2 and the stationary-side member 3 can be prevented from being disengaged. In addition, the installation in the fluid equipment and respective states (i), (ii) and (iv) in FIG. 6B are the same as those in the foregoing embodiment.

Also, in the mechanical seal 1' according to the modified example, steps of shifting to the engaged state may be as follows. After the state (ii) where the end portions 6d of the inner circumferential portion 6b and the tapered surface 2p of the cylindrical portion 2b are in contact with one another, the rotating ring 2 and the stationary-side member 3 are at once brought close to each other as in the in-use state (iv), thereafter being shifted to the state where the end portions 6d and the vertical surface 2r are engaged with one another. Such steps are taken and thereby without regulating an axial distance of approach between the rotating ring 2 and the stationary-side member 3, the rotating ring 2 and the stationary-side member 3 can be brought close to each other. Therefore, the assembly and positioning and fixing operation can be easily performed.

Second Embodiment

A mechanical seal 11 shown as a second embodiment will be described with reference to FIG. 7. The same configurations as those of the first embodiment will not be described.

Figure 7A:
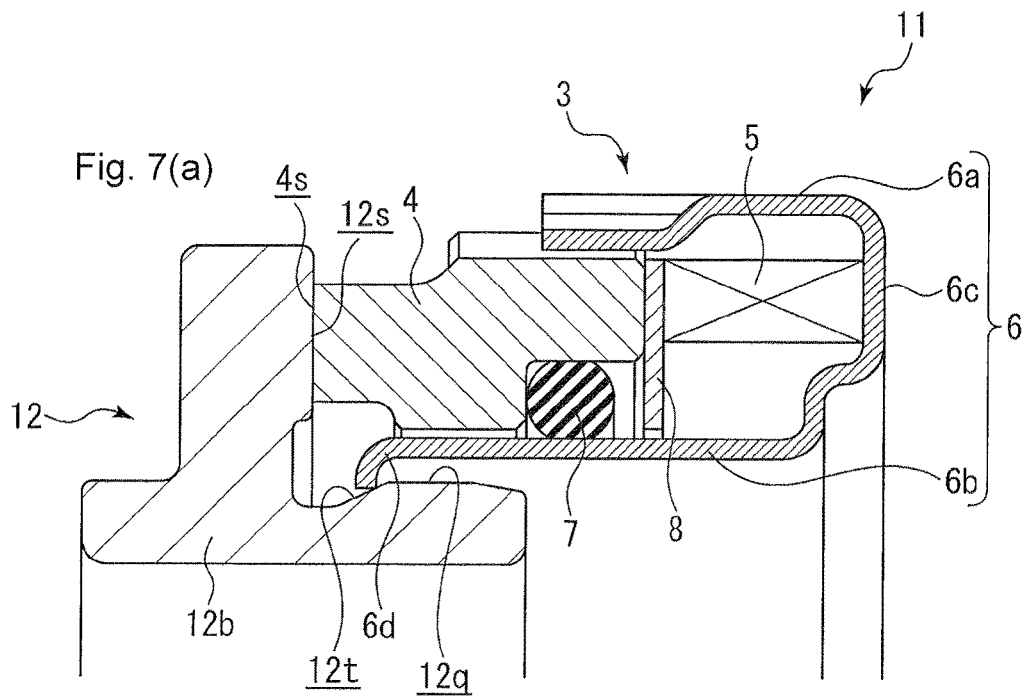
FIG. 7A is a front cross-sectional view of a second embodiment of the mechanical seal according to the present invention, illustrating a state where the mechanical seal is engaged.
Figure 7B:
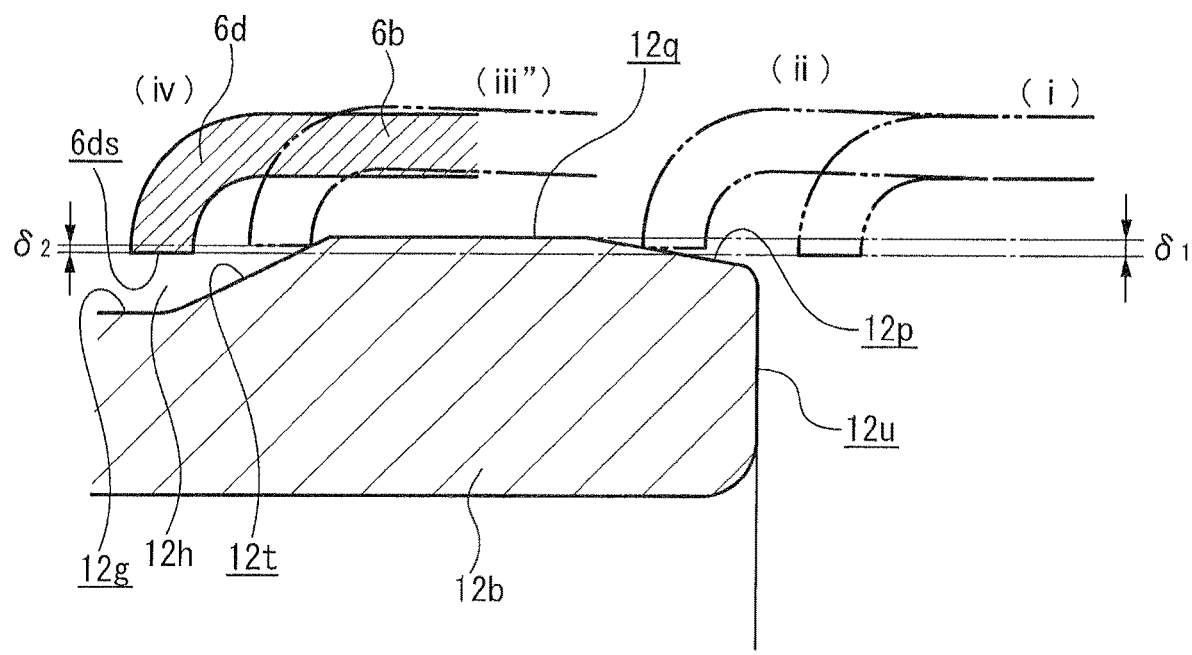
FIG. 7B is a front enlarged view of an engaging portion and its surrounding area, illustrating a state where the mechanical seal shifts to respective states.

As shown in FIG. 7, the mechanical seal 11 shown as the second embodiment includes an inclined surface 12t extending from an uninclined surface 12q provided on a cylindrical portion 12b of a rotating ring 12 toward a recessed surface 12g. The end portions 6d of the inner circumferential portion 6b are engaged with the inclined surface 12t. In other words, as shown in FIG. 7B, in a state (iii'') where the end portions 6d are engaged with the inclined surface 12t, the end portions 6d that have passed over the uninclined surface 12q are brought into contact and engagement with a portion of the inclined surface 12t of the cylindrical portion 12b. In this case, the radially outward displacement of the end portions 6d is slightly restored from δ1 at the time the end portions 6d are positioned on the uninclined surface 12q, therefore being changed into δ2.

Accordingly, a normal force generated between the distal end surface 6ds of each of the end portion 6d and the inclined surface 12t is a sum of the vertical component of force into which a restoring force due to the amount of deformation 82 of the inner circumferential portion 6b is resolved and the vertical component of force into which a reaction force due to the multi-springs 5 is resolved; therefore, a large frictional force can be obtained compared with the first embodiment. Also, the inclined surface 12t is provided; therefore, even if disassembling is required for an operation such as an inspection, the end portions 6d are deformed so as to increase the diameter and thereby the rotating ring 2 and the stationary-side member 3 can be easily separated.

Also, in the mechanical seal 11 shown as the second embodiment, the engaged state may include not only the foregoing engaged state between the end portions 6d and the inclined surface 12t but also the engaged state between the end portions 6d and the uninclined surface 12q as described in the first embodiment. Thus, a wide area of the inclined surface 12t and the uninclined surface 12q can be applied as an engaged portion of the cylindrical portion 12b. Accordingly, without regulating an axial distance of approach between the rotating ring 2 and the stationary-side member 3, the rotating ring 2 and the stationary-side member 3 can be brought close to each other. Therefore, the assembly and positioning and fixing operation can be easily performed.

Further, in a modified example of the mechanical seal 11, steps of shifting to the engaged state may be as follows. After the state (ii) where the end portions 6d of the inner circumferential portion 6b and a tapered surface 12p of the cylindrical portion 12b are in contact with one another, the rotating ring 2 and the stationary-side member 3 are at once brought close to each other as in the in-use state (iv), thereafter being shifted to the state (iii'') where the end portions 6d and the inclined surface 12t are engaged with one another. Such steps are taken and thereby without regulating an axial distance of approach between the rotating ring 12 and the stationary-side member 3, the rotating ring 12 and the stationary-side member 3 can be brought close to each other. Therefore, the assembly and positioning and fixing operation can be easily performed.

Third Embodiment

A mechanical seal 21 shown as a third embodiment will be described with reference to FIG. 8. The same configurations as those of the foregoing embodiments will not be described.

Figure 8:
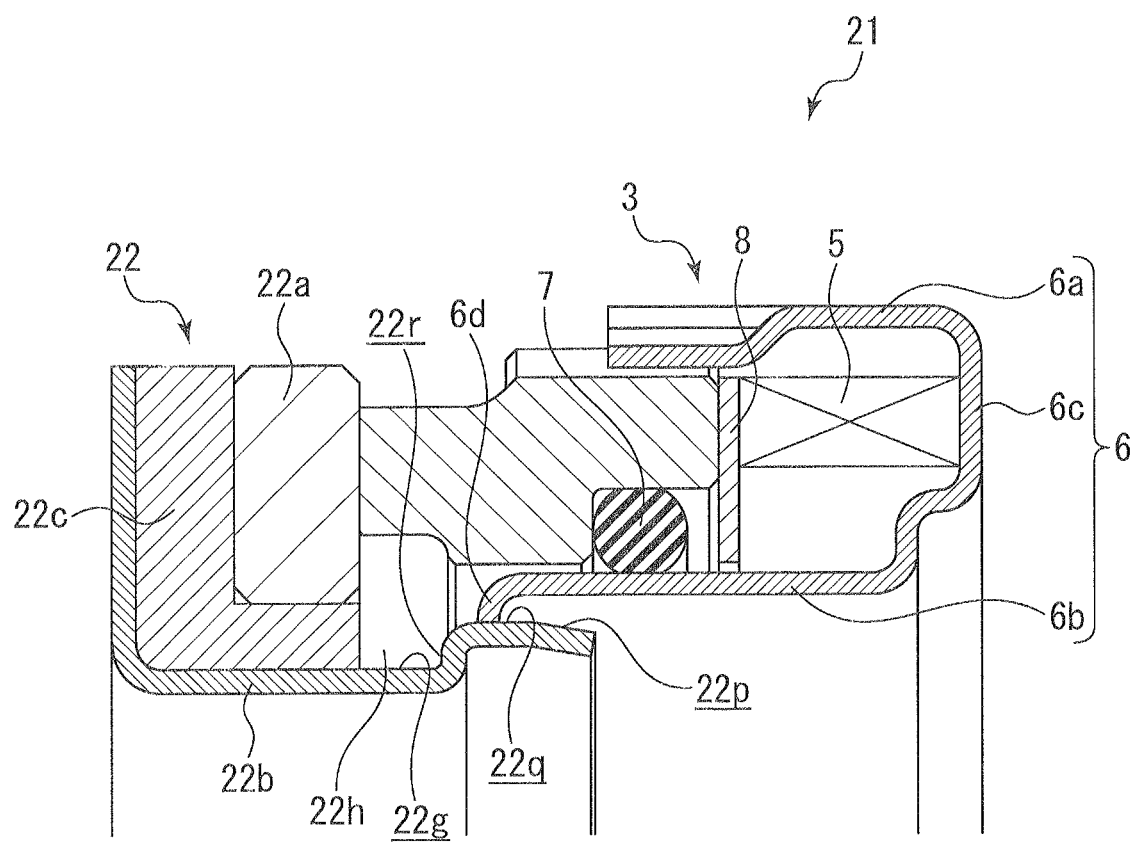
FIG. 8 is a front cross-sectional view illustrating a state where a third embodiment of the mechanical seal according to the present invention is engaged.

As shown in FIG. 8, a rotation-side member 22 of the mechanical seal 21 mainly includes plural members of a ring member 22a, a cylindrical member 22b, and a buffer 22c. The ring member 22a is held via the buffer 22c by the cylindrical member 22b. SiC as a sintered material is applied to the ring member 22a, and metal such as a metallic plate is applied to the cylindrical member 22b. A material such as rubber having elasticity is applied to the buffer 22c.

Also, an inclined surface 22p, an uninclined surface 22q, a vertical surface 22r, and a groove portion 22g are provided at an axial end portion of the cylindrical member 22b in order from an end thereof.

Next, an engaged state between the rotation-side member 22 and the stationary-side member 3 will be described. When the rotation-side member 22 and the stationary-side member 3 are brought close to each other, the inner circumferential portion 6b of the seal case 6 are elastically deformed together with the end portions 6d radially outward in a diameter expanding direction, and the cylindrical member 22b is simultaneously deformed elastically and radially inward in a diameter reducing direction. Accordingly, the end portions 6d of the inner circumferential portion 6b run on the uninclined surface 22q of the cylindrical member 22b. Therefore, the end portions 6b and the uninclined surface 22q press against one another in an up to down direction to be brought into a frictionally engaged state. In other words, in the case of the present embodiment, the cylindrical member 22b of the rotation-side member 22 and the inner circumferential portion 6b of the stationary-side member 3 are respectively deformed, thereby generating respective restoring forces. With such a configuration, components of the rotation-side member 22 can be simply shaped and manufacturing costs can be reduced.

As described above, the embodiments of the present invention are described based on the drawings; however, concrete configurations are not limited to these embodiments, and even modifications or changes without departing the scope of the present invention may be included in the present invention.

For example, in the foregoing embodiments, the end portions 6d Of the inner circumferential portion 6b are each provided in a hook shape as the engaging portion of the present invention, and the engaging portion may not have to be positioned at the end of the inner circumferential portion 6b. Alternatively, a protruded portion serving as the engaging portion may be provided near the center of the inner circumferential portion 6b in the axial direction.

Also, the plural slits 6e are provided at the end of the inner circumferential portion 6b as in the foregoing embodiments. Alternatively, a single slit may be provided, but preferably, at least three or more slits are circumferentially provided at equal intervals; thereby, stability at the time of engagement can be secured.

REFERENCE SIGNS LIST 1, 11 Mechanical seal
2, 12 Rotating ring (rotation-side member)
2a, 12a Ring portion
2b, 12b Cylindrical portion
2s, 12s, 22s Sealing face
2p, 12p, 22p Tapered portion (tapered shape: inclined surface)
2q, 12q, 22q Uninclined surface (engaged portion.)
2r, 22r Vertical surface (engaged portion)
3 Stationary-side member
4 Stationary ring
5 Multi-spring (biasing means)
6 Seal case
6b Inner circumferential portion
6e Slit
6d. End portion (engaging portion)
6dw End side surface (engaging portion)
9 Housing
10 Rotating shaft
12t Inclined surface (engaged portion)
22 Rotation-side member
22a. Ring member.
22b Cylindrical member

The invention claimed is:

1. A mechanical seal comprising:
a rotation-side member including a cylindrical portion fixed to a rotating shaft of fluid equipment and a sealing face, the rotation-side member being rotatable with the rotating shaft; and
a stationary-side member including a seal case fixed to a housing of the fluid equipment and having elasticity, a stationary ring having a sealing face and being slidably contactable with the sealing face of the rotation-side member, and a biasing spring held in the seal case to bias the stationary ring so that the stationary ring is movable in an axial direction of the rotating shaft, wherein characterized in that:
the seal case includes an inner circumferential portion extending along the rotating shaft;
the inner circumferential portion includes an engaging portion;
the cylindrical portion includes an engaged portion;
the cylindrical portion includes a recessed surface provided on the opposite side of the engaged portion from the stationary-side member in the axial direction and recessed radially inward from an outer circumferential surface of the engaged portion, and provided at a depth such that the recessed surface does not contact the engaging portion, the recessed surface having the depth that extends axially beyond the sealing faces;
an outer diameter of the engaged portion of the cylindrical portion is greater than an inner diameter of the engaging portion of the inner circumferential portion;
the engaged portion is continuously formed on the cylindrical portion over an entire circumference thereof; and
the engaging portion and the engaged portion come into contact with each other to bring the rotation-side member and the stationary-side member into engagement with each other, and
wherein when the rotation-side member and the stationary-side member are brought closer to each other, the engaged portion is located in an outer diameter side of the recessed surface, whereby the engaged state between the engaging portion and the engaged portion is released.

2. The mechanical seal according to claim 1, wherein an inclined surface is formed in one end of an outer circumferential surface of the cylindrical portion on a side of the stationary-side member so as to be inclined inward with respect to an axis of the cylindrical portion.

3. The mechanical seal according to claim 1, wherein a slit is provided in an end of the inner circumferential portion, and
wherein an O-ring is interposed between an inner circumferential portion of the seal case and the stationary ring.

4. The mechanical seal according to claim 1, wherein the engaging portion and the engaged portion radially come into contact to be engaged with each other.

5. The mechanical seal according to claim 1, wherein the engaging portion and the engaged portion axially come into contact to be engaged with each other.

6. The mechanical seal according to claim 1, wherein the rotation-side member is formed of an integral sintered material.

7. The mechanical seal according to claim 1, wherein the engaged portion of the cylindrical portion is formed by an inclined surface inclined from an outer circumferential surface of the cylindrical portion to the recessed surface.

8. The mechanical seal according to claim 2, wherein the engaging portion and the engaged portion radially come into contact to be engaged with each other.

9. The mechanical seal according to claim 3, wherein the engaging portion and the engaged portion radially come into contact to be engaged with each other.

10. The mechanical seal according to claim 2, wherein the engaging portion and the engaged portion axially come into contact to be engaged with each other.

11. The mechanical seal according to claim 3, wherein the engaging portion and the engaged portion axially come into contact to be engaged with each other.

12. The mechanical seal according to claim 2, wherein the rotation-side member is formed of an integral sintered material.

13. The mechanical seal according to claim 3, wherein the rotation-side member is formed of an integral sintered material.

14. The mechanical seal according to claim 4, wherein the rotation-side member is formed of an integral sintered material.

15. The mechanical seal according to claim 5, wherein the rotation-side member is formed of an integral sintered material.

16. The mechanical seal according to claim 2, wherein the engaged portion of the cylindrical portion is formed by an inclined surface inclined from an outer circumferential surface of the cylindrical portion to the recessed surface.

17. The mechanical seal according to claim 3, wherein the engaged portion of the cylindrical portion is formed by an inclined surface inclined from an outer circumferential surface of the cylindrical portion to the recessed surface.

18. The mechanical seal according to claim 4, wherein the engaged portion of the cylindrical portion is formed by an inclined surface inclined from an outer circumferential surface of the cylindrical portion to the recessed surface.

19. The mechanical seal according to claim 5, wherein the engaged portion of the cylindrical portion is formed by an inclined surface inclined from an outer circumferential surface of the cylindrical portion to the recessed surface.

20. The mechanical seal according to claim 6, wherein the engaged portion of the cylindrical portion is formed by an inclined surface inclined from an outer circumferential surface of the cylindrical portion to the recessed surface.

* * * * *